United States Patent
Hwang et al.

(10) Patent No.: US 11,066,058 B2
(45) Date of Patent: Jul. 20, 2021

(54) METHOD OF CONTROLLING VACUUM PRESSURE FOR VEHICLE BRAKING

(71) Applicants: Hyundai Motor Company, Seoul (KR); Kia Motors Corporation, Seoul (KR)

(72) Inventors: Kook-Jin Hwang, Suwon-si (KR); Hyun-Sung Park, Hwaseong-si (KR); Young-Kyo Chung, Seoul (KR); Ho-Chul Jee, Suwon-si (KR); Tae-Hun Jung, Seoul (KR); Tae-Woo Lee, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 133 days.

(21) Appl. No.: 16/684,166

(22) Filed: Nov. 14, 2019

(65) Prior Publication Data

US 2020/0172075 A1   Jun. 4, 2020

(30) Foreign Application Priority Data

Nov. 30, 2018 (KR) .................. 10-2018-0151731

(51) Int. Cl.
| | |
|---|---|
| *F02D 41/12* | (2006.01) |
| *B60T 13/72* | (2006.01) |
| *F02D 13/02* | (2006.01) |
| *B60H 1/32* | (2006.01) |
| *F02D 41/08* | (2006.01) |

(52) U.S. Cl.
CPC ............ *B60T 13/72* (2013.01); *B60H 1/3205* (2013.01); *F02D 13/0223* (2013.01); *F02D 41/083* (2013.01); *F02D 41/12* (2013.01)

(58) Field of Classification Search
CPC .......... B60T 13/72; B60T 13/52; B60T 17/22; F02D 13/0223; F02D 41/12; F02D 41/083; F02D 41/0005; F02D 2250/24; F02D 2250/41; B60H 1/3205; Y02T 10/40; Y02T 10/12
USPC ................... 123/320, 339.1, 339.17, 339.18; 701/103, 107, 110, 112, 113
See application file for complete search history.

(56) References Cited

U.S. PATENT DOCUMENTS 9,422,861 B2 *   8/2016   Miyagawa ......... B60H 1/00849

FOREIGN PATENT DOCUMENTS

KR   100667439 B1   1/2007

* cited by examiner

*Primary Examiner* — Hai H Huynh
(74) *Attorney, Agent, or Firm* — Slater Matsil, LLP

(57) ABSTRACT

A method of controlling vacuum pressure for vehicle braking may include checking whether a vehicle is idle or enters a deceleration state, comparing an engine vacuum pressure and a booster vacuum pressure of the vehicle with a preset reference value, checking whether a valve control system of the vehicle is operable when the engine vacuum pressure and the booster vacuum pressure are lower less than the preset reference value, controlling the valve control system when the valve control system is operable; and controlling an air conditioner (A/C) or an alternator of the vehicle when the valve control system is inoperable.

15 Claims, 4 Drawing Sheets

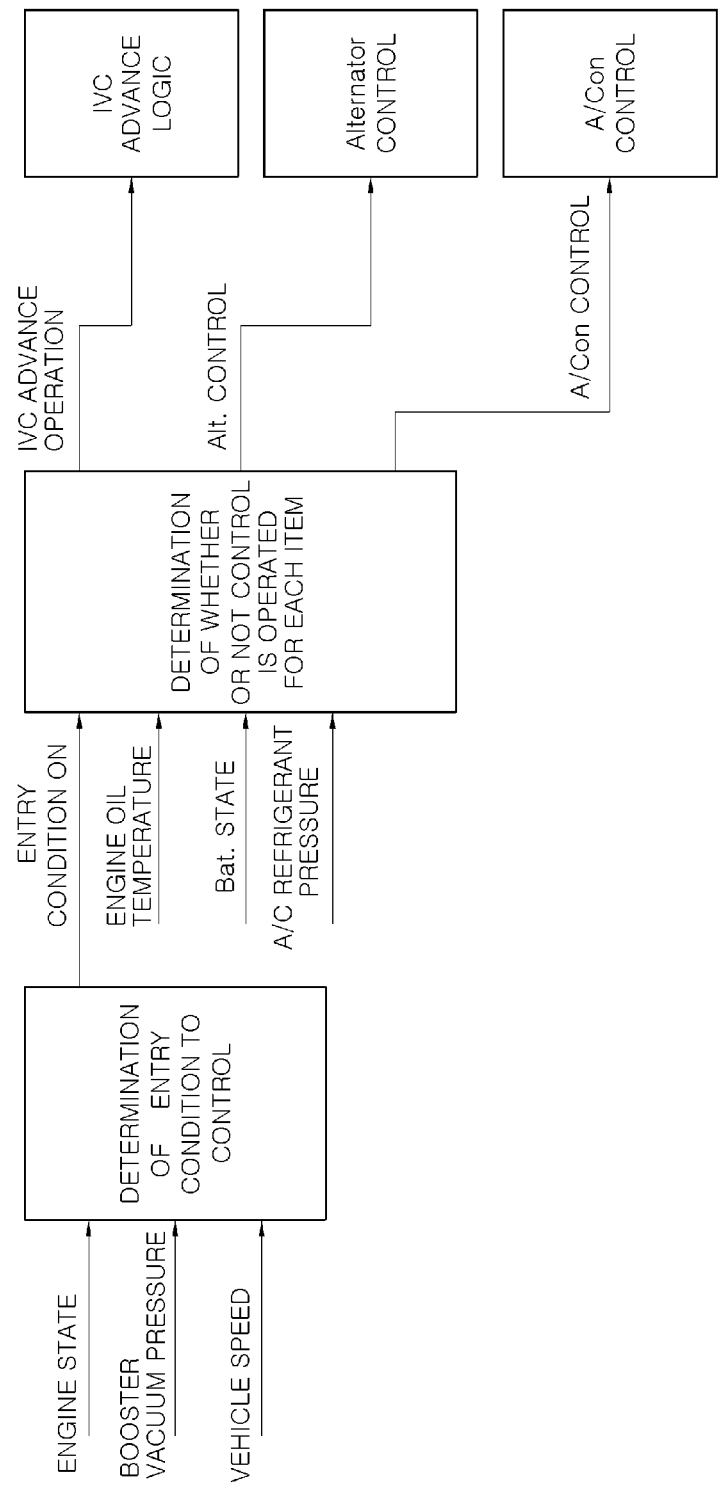

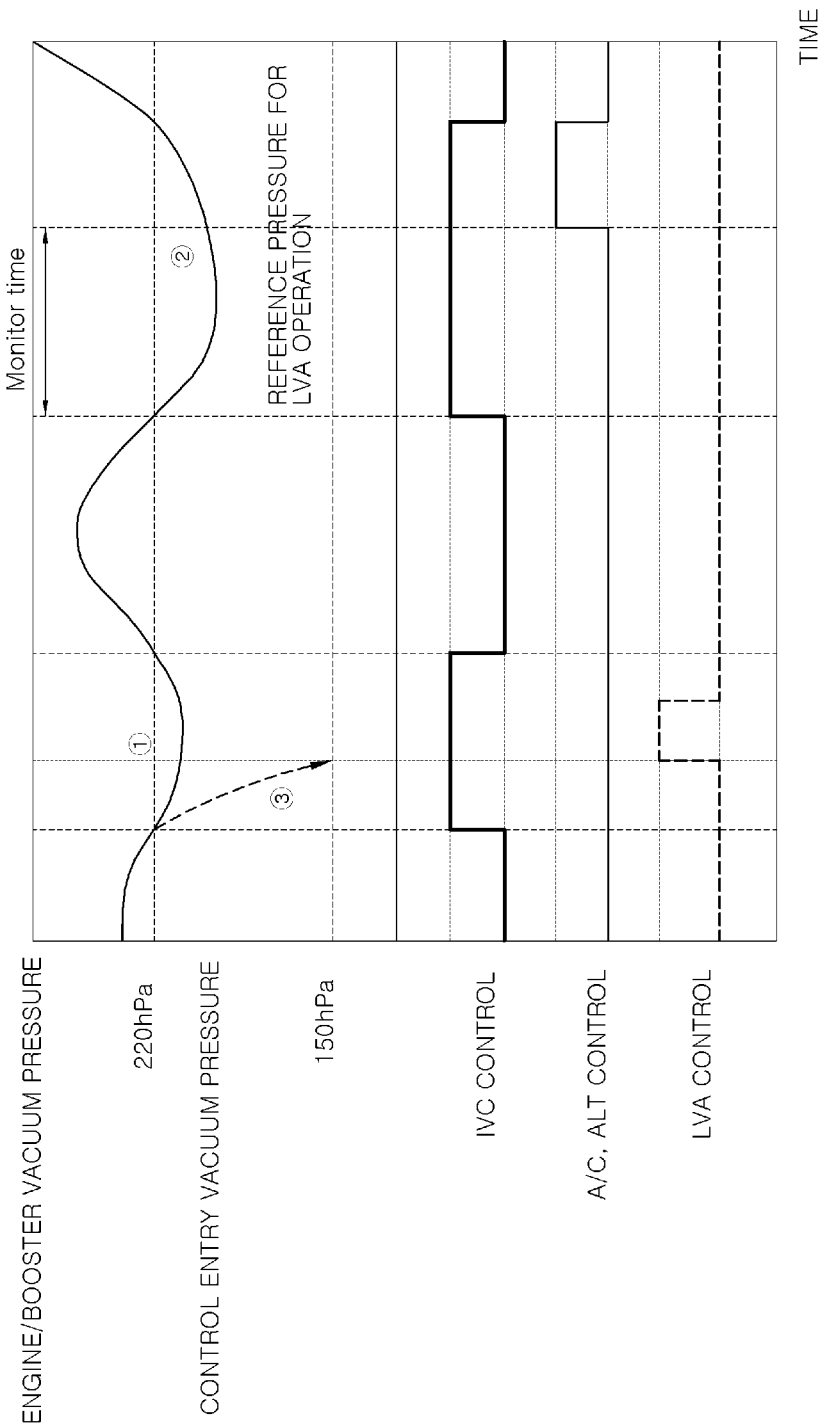

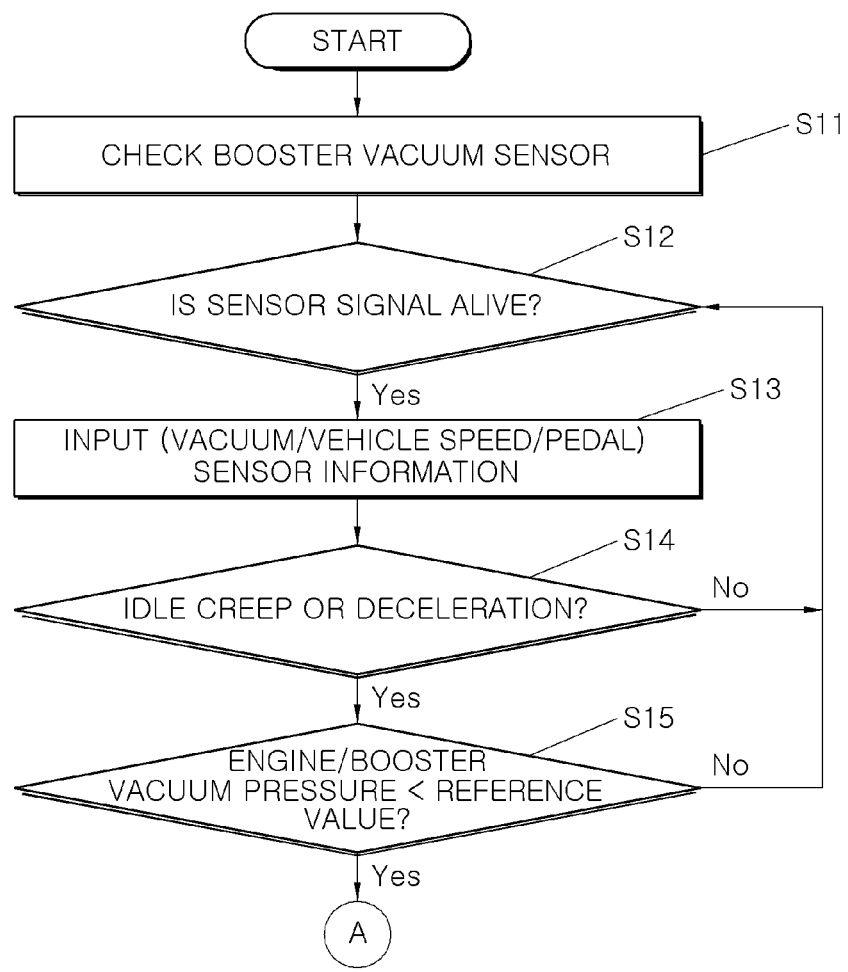

METHOD OF CONTROLLING VACUUM PRESSURE FOR VEHICLE BRAKING

CROSS-REFERENCE TO RELATED APPLICATIONS

This application claims priority to Korean Patent Application No. 10-2018-0151731, filed on Nov. 30, 2018, which application is hereby incorporated herein by reference.

TECHNICAL FIELD

Exemplary embodiments of the present disclosure relate to a method of controlling vacuum pressure for vehicle braking.

BACKGROUND

In general, a braking device serves to generate a braking force on a traveling vehicle to prevent the vehicle from moving on its own. The braking device is usually operated by the hydraulic pressure generated by and supplied from a master cylinder with the operation of a brake pedal.

That is, the vehicle includes a brake pedal that is pressed by a driver's foot to generate a braking force, a booster that amplifies the force applied to the brake pedal using the difference between the negative pressure (vacuum pressure) generated in an engine and the atmospheric pressure, a master cylinder that switches the force applied to the brake pedal to a hydraulic pressure, and a brake that substantially generates the braking force by the hydraulic pressure supplied from the master cylinder.

In case the vacuum pressure is not generated enough in the engine or is further required, the vehicle is additionally equipped with a vacuum pump for smooth braking.

In the conventional method of adding the vacuum pump, it may lead to an excessive increase in cost in the case of an electric vacuum pump (EVP) and a deterioration of fuel efficiency in the case of a mechanical vacuum pump (MVP).

In order to resolve these problems, the intake valve closing (IVC) advance control of a valve control system or A/C cut control has been performed to reduce an engine idle load. However, such a method causes the pump to operate with excessive frequency even when it is not absolutely necessary due to inconsistent control with in-manifold vacuum pressure, which has side effects such as unstable idling or cooling performance deterioration.

The foregoing is intended merely to aid in the understanding of the background of the present disclosure, and is not intended to mean that the present disclosure falls within the purview Korean Patent No. 10-0667439 discloses subject matter related to subject matter disclosed herein.

SUMMARY

An embodiment of the present disclosure is directed to a method of controlling vacuum pressure for vehicle braking, which is capable of ensuring a sufficient vacuum pressure even without using a vacuum pump since IVC advance control, A/C control, or the like for braking vacuum pressure is not excessively performed.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, a method of controlling vacuum pressure for vehicle braking includes checking whether a vehicle is idle or enters a deceleration state, comparing an engine vacuum pressure and a booster vacuum pressure of the vehicle with a preset reference value, checking whether a valve control system of the vehicle is operable when the engine vacuum pressure and the booster vacuum pressure are lower less than the preset reference value, controlling the valve control system when the valve control system is operable, and controlling an air conditioner (A/C) or an alternator of the vehicle when the valve control system is inoperable.

The controlling the valve control system may be performed for intake valve closing (IVC) advance control of the valve control system.

The controlling an air conditioner or an alternator may be performed to reduce or cut-off a duty of a compressor of the air conditioner.

The controlling an air conditioner or an alternator may be performed to lower a generation control voltage of the alternator.

The method may further include performing first booster vacuum pressure comparison of determining whether the booster vacuum pressure is equal to or higher than a reference value+hysteresis (Hys.) after the controlling the valve control system, and when the booster vacuum pressure is equal to or higher than the reference value+hysteresis (Hys.), the control may be completed.

When the booster vacuum pressure is lower than the reference value+hysteresis (Hys.) in the performing first booster vacuum pressure comparison, the controlling an air conditioner or an alternator of the vehicle may be performed.

The method may further include performing second booster vacuum pressure comparison of determining whether the booster vacuum pressure is equal to or higher than a reference value+hysteresis (Hys.) after the controlling an air conditioner or an alternator of the vehicle is performed, and when the booster vacuum pressure is equal to or higher than the reference value+hysteresis (Hys.) in the performing second booster vacuum pressure comparison, the control may be completed.

When the booster vacuum pressure is lower than the reference value+hysteresis (Hys.) in the performing second booster vacuum pressure comparison, a low vacuum assist (LVA) may be operated and controlled.

BRIEF DESCRIPTION OF THE DRAWINGS

FIG. 1 is a conceptual block diagram illustrating a method of controlling vacuum pressure for vehicle braking according to the present disclosure.

FIG. 2 is a graph for explaining the method of controlling vacuum pressure for vehicle braking according to the present disclosure.

FIGS. 3A and 3B is a flowchart illustrating the method of controlling vacuum pressure for vehicle braking according to the present disclosure.

DETAILED DESCRIPTION OF ILLUSTRATIVE EMBODIMENTS

Figure 3B:
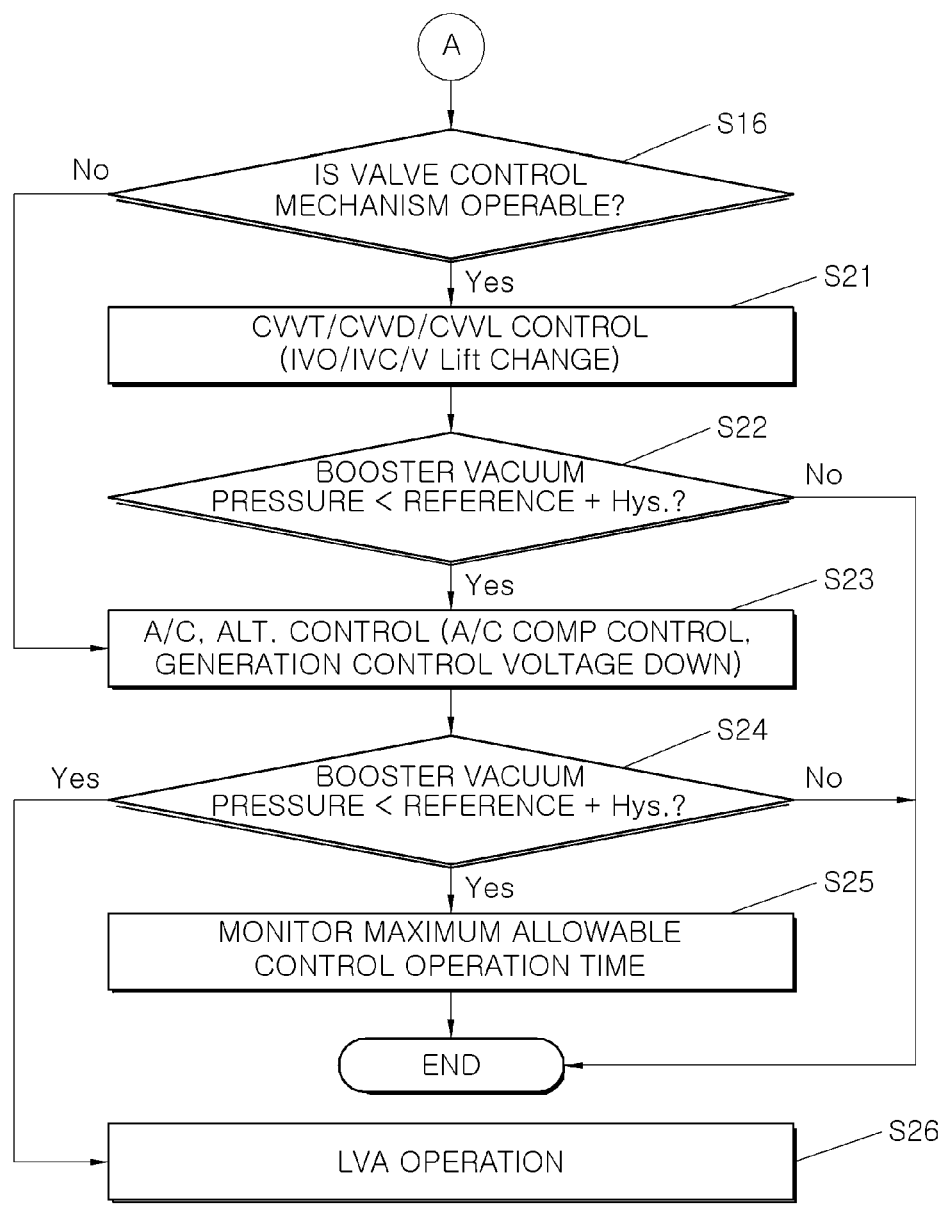

The accompanying drawings for illustrating exemplary embodiments of the present disclosure should be referred to in order to gain a sufficient understanding of the present disclosure, the merits thereof, and the objectives accomplished by the implementation of the present disclosure.

In the exemplary embodiments of the present disclosure, techniques well known in the art or repeated descriptions may be reduced or omitted to avoid obscuring appreciation of the disclosure by a person of ordinary skill in the art.

FIG. 1 is a conceptual block diagram illustrating a method of controlling vacuum pressure for vehicle braking according to the present disclosure. FIG. 2 is a graph for explaining the method of controlling vacuum pressure for vehicle braking according to the present disclosure. FIG. 3A and 3B is a flowchart illustrating the method of controlling vacuum pressure for vehicle braking according to the present disclosure.

Hereinafter, a method of controlling vacuum pressure for vehicle braking according to an embodiment of the present disclosure will be described with reference to FIGS. 1 to 3B.

The method of controlling vacuum pressure for vehicle braking according to the present disclosure is carried out only when necessary by accurately determining a timing of intake valve closing (IVC) advance control of a valve control system or A/C cut control to reduce an engine idle load, thereby ensuring a sufficient vacuum pressure if necessary.

In other words, as illustrated in FIG. 1, the method of the present disclosure determines a vacuum control entry condition, determines whether or not control operation is possible, and performs IVC advance control, alternator control, and/or A/C control.

The vacuum control entry condition is determined by means of a booster vacuum pressure for braking, an engine vacuum pressure, and a vehicle speed.

The whether or not control operation is possible for each control item is determined by whether or not each of the IVC advance element of the valve control system such as CVVT, CVVL, or CVVD, the alternator, and the A/C is operable, so as to control it.

When the vacuum pressure may not be ensured by the above control, a low vacuum assist (LVA) is interlocked and controlled.

The control concept of the present disclosure will be described in more detail with reference to FIG. 2. When both of the booster vacuum pressure and the engine vacuum pressure are lower than a control entry vacuum pressure in an idle condition, the IVC advance control is operated to improve the vacuum pressure and then released (①).

That is, intake valve opening (IVO) and intake valve closing (IVC) are controlled at an optimal position by the valve control system such as CVVT, CVVD, or CVVL.

When the vacuum pressure is not recovered until the IVC advance control is performed and then released within a monitor time, the A/C control and the alternator control are operated to additionally recover the vacuum pressure and then released (②).

That is, the A/C control is performed to minimize or cut-off the duty of a compressor (comp.), and the alternator control is performed to lower a generation control voltage.

When the vacuum pressure for braking is not recovered despite of the control of ① and ②, the LVA is operated to secure a safe braking function (③).

That is, the hydraulic pressure for braking is controlled by controlling the hydraulic motor of an electronic stability control (ESC).

As described above, the present disclosure sequentially performs the minimum necessary control according to the state of the booster vacuum pressure to secure the vacuum pressure.

The sequential control method will be described in more detail with reference to FIG. 3A and 3B.

First, a booster vacuum sensor is checked (S11), and whether or not a sensor signal is alive is checked (S12).

Next, information is input from (vacuum, vehicle speed, and pedal) sensors to determine the control entry condition (S13).

Next, whether or not it is idle or in a deceleration state is checked (S14).

The above processes are a normal value diagnosis process for the basic input value sensor of logic operation, and an entry condition determination process using an in-manifold/booster vacuum pressure, whether or not it is idle, and a vehicle speed.

When the control entry condition determination is completed by the above processes, it is determined whether the engine vacuum pressure and the booster vacuum pressure are lower than a reference value (S15). In such a case, control is performed.

It is determined whether or not the valve control system is operable to perform the control (S16). If it is possible, the IVO, IVC, and V Lift controls are performed (S21).

The whether or not the valve control system is operable is determined by whether or not a function is available by determining an oil temperature, a catalyst heating (CH) mode, or the like.

As a result, when the operation of the valve control system is impossible, the control of step S23 is performed.

When it is determined that the booster vacuum pressure is equal to or higher than a reference value+hysteresis (Hys.) so that the vacuum pressure is formed in a first booster vacuum pressure comparison step (S22) after the control of step S21, the control is completed.

However, when the booster vacuum pressure is lower than the reference value+hysteresis, the alternator and A/C controls are performed (S23).

That is, the A/C control is performed to minimize or cut-off the duty of the compressor (comp.), and the alternator control is performed to lower the generation control voltage.

Here, the alternator control is preferably performed only when the state of charge (SOC) of a battery is equal to or higher than a certain level.

Next, when it is determined that the booster vacuum pressure is equal to or higher than the reference value+hysteresis (Hys.) so that the vacuum pressure is formed in a second booster vacuum pressure comparison step (S24), the control is completed.

However, when the booster vacuum pressure is continuously insufficient for a predetermined time or more despite of the above control in a maximum allowable control operation time monitoring step (S25), the control is forcibly completed to secure an intrinsic cooling function.

Next, the control is performed such that the LVA is operated (S26).

That is, it is possible to secure safety by controlling the hydraulic motor of the electronic stability control (ESC).

The method of controlling vacuum pressure for vehicle braking according to the present disclosure can ensure a sufficient vacuum pressure by performing the vacuum control for braking, such as IVC advance or A/C cut, at the time when it is required with more accuracy, thereby preventing unstable idling, cooling performance deterioration, or the like.

Furthermore, since there is no need for any vacuum pumps, it is possible to reduce costs and improve fuel efficiency.

While the specific embodiments have been described with reference to the drawings, the present disclosure is not limited thereto. It will be apparent to those skilled in the art that various changes and modifications may be made without departing from the spirit and scope of the disclosure as defined in the following claims. Therefore, these changes and modifications will fall within the scope of the disclosure as long as they are apparent to those skilled in the art, and the scope of the present disclosure should be defined based on the entire content set forth in the appended claims.

What is claimed is:

1. A method of controlling vacuum pressure for vehicle braking, the method comprising:
    checking whether a vehicle is idle or enters a deceleration state;
    comparing an engine vacuum pressure and a booster vacuum pressure of the vehicle with a preset reference value;
    checking whether a valve control system of the vehicle is operable when the engine vacuum pressure and the booster vacuum pressure are lower than the preset reference value;
    controlling the valve control system when the valve control system is operable; and
    controlling an air conditioner or an alternator of the vehicle when the valve control system is inoperable.

2. The method of claim 1, wherein controlling the valve control system is performed for intake valve closing (IVC) advance control of the valve control system.

3. The method of claim 2, wherein controlling the air conditioner or the alternator is performed to reduce or cut-off a duty of a compressor of the air conditioner.

4. The method of claim 2, wherein controlling the air conditioner or the alternator is performed to lower a generation control voltage of the alternator.

5. The method of claim 1, further comprising performing a first booster vacuum pressure comparison by determining whether the booster vacuum pressure is equal to or higher than a reference value+hysteresis (Hys.) after controlling the valve control system.

6. The method of claim 5, wherein the controlling is completed when the booster vacuum pressure is equal to or higher than the reference value+hysteresis (Hys.).

7. The method of claim 6, wherein controlling the air conditioner all the alternator of the vehicle is performed when the booster vacuum pressure is lower than the reference value+hysteresis (Hys.) in performing the first booster vacuum pressure comparison.

8. The method of claim 7, further comprising performing a second booster vacuum pressure comparison by determining whether the booster vacuum pressure is equal to or higher than the reference value+hysteresis (Hys.) after controlling the air conditioner or the alternator of the vehicle.

9. The method of claim 8, wherein the controlling is completed when the booster vacuum pressure is equal to or higher than the reference value+hysteresis (Hys.) in performing the second booster vacuum pressure comparison.

10. The method of claim 9, wherein a low vacuum assist (LVA) is operated and controlled when the booster vacuum pressure is lower than the reference value+hysteresis (Hys.) in performing the second booster vacuum pressure comparison.

11. The method of claim 5, wherein controlling the air conditioner all the alternator of the vehicle is performed when the booster vacuum pressure is lower than the reference value+hysteresis (Hys.) in performing the first booster vacuum pressure comparison.

12. The method of claim 11, further comprising performing a second booster vacuum pressure comparison by determining whether the booster vacuum pressure is equal to or higher than the reference value+hysteresis (Hys.) after controlling the air conditioner or the alternator of the vehicle.

13. The method of claim 12, wherein the controlling is completed when the booster vacuum pressure is equal to or higher than the reference value+hysteresis (Hys.) in performing the second booster vacuum pressure comparison.

14. The method of claim 13, wherein a low vacuum assist (LVA) is operated and controlled when the booster vacuum pressure is lower than the reference value+hysteresis (Hys.) in performing the second booster vacuum pressure comparison.

15. The method of claim 12, wherein a low vacuum assist (LVA) is operated and controlled when the booster vacuum pressure is lower than the reference value+hysteresis (Hys.) in performing the second booster vacuum pressure comparison.

* * * * *